Figure 1:
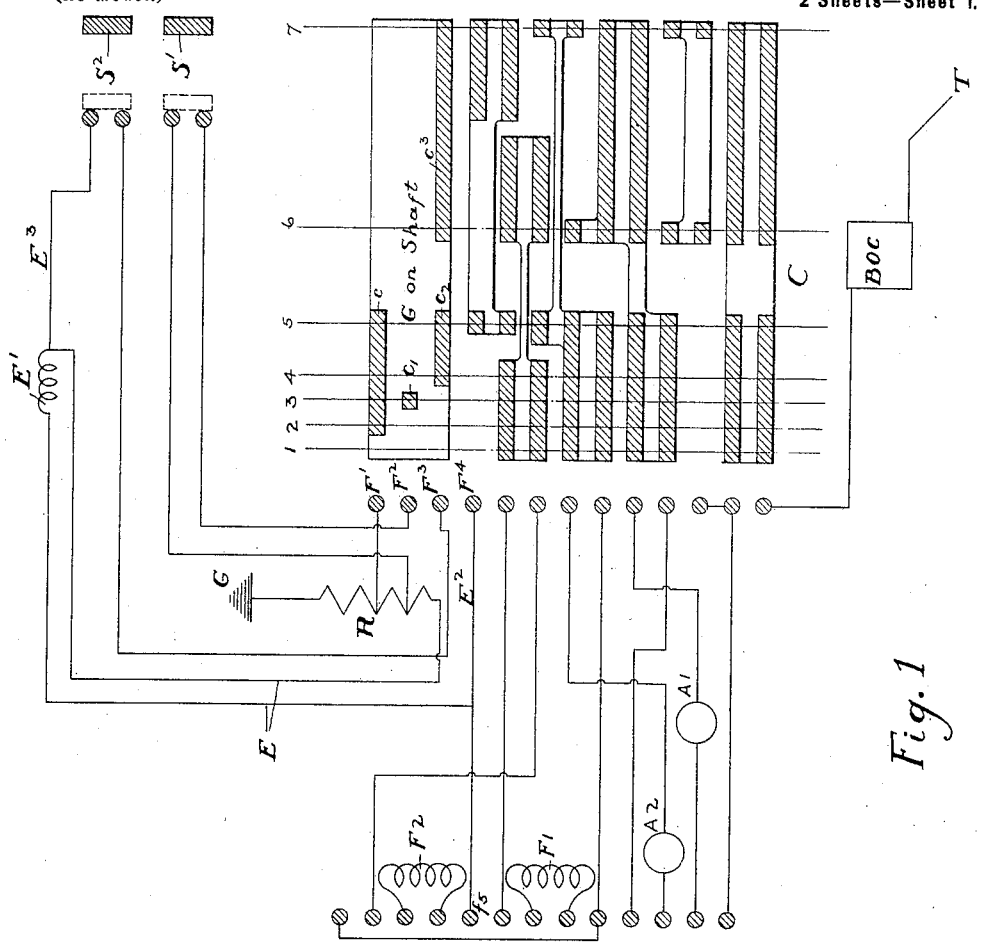

No. 685,755. Patented Nov. 5, 1901.
F. W. GARRETT & E. W. STULL.
CONTROLLER FOR ELECTRIC RAILWAY MOTORS.
(Application filed Apr. 8, 1901.)

(No Model.) 2 Sheets—Sheet 1.

WITNESSES:
INVENTORS
F. W. Garrett,
E. W. Stull
BY
Geo. H. Parmelee,
their ATTORNEY.

No. 685,755. Patented Nov. 5, 1901.
F. W. GARRETT & E. W. STULL.
CONTROLLER FOR ELECTRIC RAILWAY MOTORS.
(Application filed Apr. 8, 1901.)

(No Model.) 2 Sheets—Sheet 2.

UNITED STATES PATENT OFFICE.

FRANK W. GARRETT AND EMMETT W. STULL, OF JOHNSTOWN, PENNSYLVANIA, ASSIGNORS TO THE LORAIN STEEL COMPANY, A CORPORATION OF PENNSYLVANIA.

CONTROLLER FOR ELECTRIC RAILWAY-MOTORS.

SPECIFICATION forming part of Letters Patent No. 685,755, dated November 5, 1901.

Application filed April 8, 1901. Serial No. 54,879. (No model.)

*To all whom it may concern:*

Be it known that we, FRANK W. GARRETT and EMMETT W. STULL, of Johnstown, in the county of Cambria and State of Pennsylvania, have invented a new and useful Improvement in Controllers for Electric Railway-Motors, of which the following is a full, clear, and exact description, reference being had to the accompanying drawings, which form a part of this specification.

Our invention has relation to controllers for electric railway-motors.

With the controllers ordinarily used in order to reverse the motors when the car is in motion the motorman must first move the regulating-switch of the controller to off or open-circuit position, then throw his reverse-switch, and finally must move his regulating-switch back to one of its running positions. These three operations are necessary for the reason that as ordinarily arranged if the motors are reversed while carrying current, being at the moment of reversal no longer protected by their counter electromotive force, they will receive such a rush of current as to seriously endanger or destroy them. It is therefore necessary in the usual practice to first open the motor-circuit, then reverse the motors, and then again admit current thereto. The motorman must make these three movements rapidly and usually under emergency conditions, when his failure to act promptly and properly may result disastrously to life or limb, and owing to confusion or lack of sufficient presence of mind may fail to act in time to avert accident.

The main object of our invention is to provide a controller which will greatly simplify the operation of reversing the motors by reducing such operation to a single movement—viz., the throwing of the reverse-switch from ahead to back position or the reverse—no matter what may be the position of the regulating-switch and to provide means whereby this may be done without injury to the motors.

In the ordinary type of controller, moreover, means of some kind must be provided for preventing the reverse-switch from being operated unless the regulating-switch is first moved to off position, since otherwise the motorman might reverse at a time when the motors are carrying full current and are unprotected. Our invention, which, as above indicated, permits the reverse-switch to be thrown at any time without regard to the position of the regulating-switch, obviates the necessity for any such means and simplifies the construction of the controller.

Other objects of our invention will hereinafter appear.

We attain the above-stated objects by providing the controller with contact or switch devices which operate automatically upon movement of the reverse-switch across its off or open-circuit position from ahead to back or the reverse to immediately introduce into the motor-circuit a sufficient amount of external resistance to effectually protect the motors. This external resistance is preferably, although not necessarily, the same resistance or some portion thereof which is used in starting the motors from a position of rest. The contact or switch devices above referred to are also so arranged that a movement of the regulating-switch subsequent to reversal from its position at the time of reversal to an adjacent position will again cut the external resistance out of the motor-circuit.

Our invention also consists in the novel construction, arrangement, and combination of parts, all as hereinafter described, and pointed out in the appended claims, reference being had to the accompanying drawings, in which—

Figure 3:
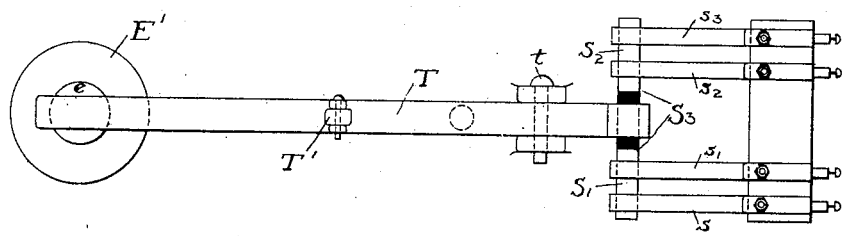
Figure 2:
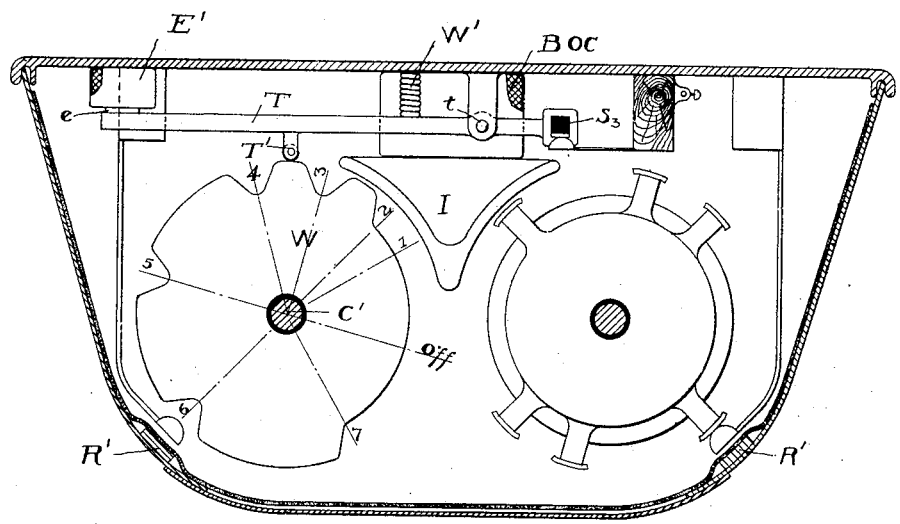

Figure 1 is a diagram illustrating the invention; Fig. 2, a sectional plan view of our improved controller; Fig. 3, a plan view of the auxiliary switches, and Fig. 4 a diagram showing graphically one of the motor positions.

Referring first to Fig. 1, the letter C designates a development of the contact-carrying drum of the regulating-switch of the controller, and R S a development of a combined reverse and motor-cut-out switch of well-known character. A' and A² designate, respectively, the armatures of two electric motors, and F' and F² the respective field-coils thereof. R designates artificial resistance for connection in the motor-circuit. The particular controller illustrated by this diagram, in so far as the motor combinations effected thereby are concerned, is of that type now well known commercially in which the motors are started from a position of rest in series with each other and with the artificial resistance, the latter being then gradually and finally entirely removed from circuit, after which further movement of the controller-drum successively connects the fields of the motors in parallel and in series with the armatures, then the armatures in parallel and in series with the series-connected fields, and finally the motors as a whole in parallel. Our present invention, however, while shown as applied to a controller of this type, is not limited thereto, and the full controller diagram is shown only for the purpose of permitting the several circuits to be readily traced and the operation of our invention to be more readily understood. We shall describe in detail only such parts of the circuits as are more immediately concerned with our invention. The applied circuits can be readily traced on the diagram without detailed description. One end of the resistance-coil R is connected to ground at G, and the other end is connected to a conductor E, which includes a coil E'. This conductor E is connected at its other end to a contact-finger $f^5$ of the reverse-switch and in all positions of the drum C forms the connection from the motors to the return side of the circuit either through the finger $f^5$ (when the two fields are connected in series) or through the said finger and the finger $F^4$ of the regulating-switch and conductor $E^2$, (when the fields are connected in multiple.) Successive sections of the resistance R are connected, as shown, with fingers F' and $F^2$ of the regulating-switch, the connection of the finger $F^2$ being through an auxiliary switch S', which will hereinafter be more fully described. A branch conductor $E^3$ of the conductor E is connected to contact-finger $F^3$ of the regulating-switch through a second auxiliary switch $S^2$. The three fingers F', $F^2$, and $F^3$ are arranged to engage the upper group of contacts of the drum C. These contacts are respectively designated as c, c', $c^2$, and $c^3$, and the drum-casting to which they are secured is grounded through the shaft of the drum. The seven running positions of the drum are designated by the broken vertical lines numbered from 1 to 7, inclusive, on the diagram. The auxiliary switch S' consists of two fixed contacts s and s' and a movable bridging-contact, to which the reference character S' is directly applied, and the switch $S^2$ is of similar character, having two fixed contacts $s^2$ $s^3$ and a movable or bridging contact $S^2$.

Referring now to Figs. 2 and 3, it will be seen that the two bridging-contacts S' and $S^2$ are mounted on a single movable piece or arm $S^3$, upon which they are insulated from each other, and that the said piece $S^3$ is carried by one arm of a lever T, fulcrumed at t and carrying on its other arm a small roller T', which is arranged to contact with the irregular cam edge of a plate or disk W on the shaft C' of the drum C under the action of a compression-spring W'. The plate or disk W has a notch or depression corresponding to each of the running positions 3, 4, 5, 6, and 7 of the drum, and also a low portion extending across the off position and also positions 1 and 2 of the drum. The several positions of the drum are indicated in Fig. 2 by broken radial lines corresponding to the broken vertical lines of Fig. 1. The coil E', before referred to as being included in the return-conductor E, is wound about a core-piece e of the controller-casing opposite the roller-carrying arm of the lever T, which is thereby made to form an armature. When the said roller is resting in one of the low portions or notches of the plate or disk W, both the auxiliary switches S' and $S^2$ are open. The magnet formed by the said coil E' is designed to be a comparatively weak magnet of insufficient strength to attract the lever T across the wide air-gap which exists when the auxiliary switches are in open position and against the action of the spring W', but is of sufficient strength to attract and hold the said lever when the said roller rides onto one of the high portions of the said disk or plate.

B O C indicates a blow-out coil having a pole-piece I common to both the drums C and R, the controller-casing also having opposite the contact-fingers of each of said drums a polar reinforcement R', the arrangement being such as to effectually extinguish arcs formed at the contacts of either drum. These blow-out devices, however, form no part of our present invention, but are fully described and claimed in the pending application of F. A. Merrick and E. W. Stull, Serial No. 50,982.

Figure 4:
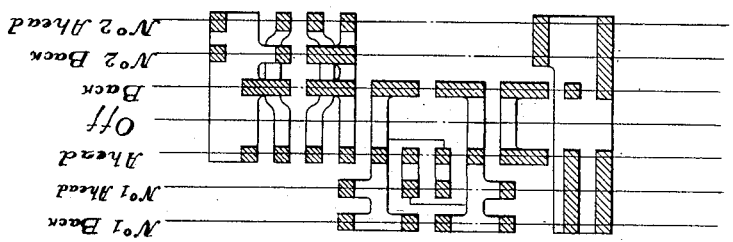
Figure 4:
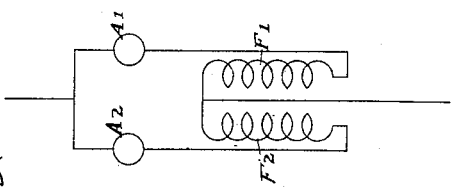

It will be apparent from the above description and from Figs. 1 and 2 of the drawings that the coil E' will always carry current so long as the motor-circuit remains closed, but that whenever the circuit is open, either at the regulating-switch or at the reverse-switch, the current will no longer flow through the said coil. When the drum C is at off position, there is therefore no current in the said coil and the roller T' of the lever T will be resting upon the low portion of the disk W, thereby holding the auxiliary switches S' and $S^2$ in open position, which will also be maintained when the said drum is moved to positions 1 and 2. In moving from position 2 to position 3, however, said roller will ride upon the intermediate high portions of the said disk, thereby forcing the lever T to a position where it will be attracted and held by the magnet E', thus closing both switches S' and $S^2$. These switches will remain closed during the further forward movement of the controller and also during the return movement of the controller to off position, provided that the circuit is not in the meantime opened at the reverse-switch, which, as shown, has an open-circuit position between its ahead and back positions. In the normal operation of the controller at position 1 the return-circuit from the motors is through conductor E and coil E' to resistance R and through said resistance to ground. At position 2 the circuit and the resistance are the same as in position 1; but owing to the fact that contact-finger F' has engaged the grounded contact c only two sections of the resistance will now be in circuit. In passing to position 3 the switches S' and S² are closed. The switch S² has, however, no function at this position, and the return-circuit from the motors is through the coil E', to and through the first section of resistance R, to and through auxiliary switch S', to finger F², to grounded contact c'. At position 4 the circuit is through coil E', branch conductor E³, auxiliary switch S², contact-finger F³, grounded contact c², thus short-circuiting the entire resistance, which remains short-circuited through the remaining positions of the drum. Should the reverse-switch be thrown when the drum C is at its first position, it will be seen that the entire resistance will be included in the motor-circuit and that no harm can result to the motors. Should the reverse-switch be thrown when the drum C is at position 2, the auxiliary switches S' and S² being still open, two sections of the resistance will be in circuit. The operation of the reverse-switch at position 3 of the drum C will open the auxiliary switches S² and S³ and two sections of the resistance will be in circuit, as at position 2. The purpose of the auxiliary switch S' will now be understood. It will be seen that if this switch were not provided, but a direct connection was made from the terminal of the first section of the resistance to the contact-finger F², if the motors were reversed at position 3 of the drum C, but a single section of the resistance would be in circuit, which might be insufficient for the protection of the motors. By the provision of the switch S', however, we are enabled to use only one section of the resistance normally in the circuit at this position, but provide for the immediate insertion of an additional section should the motors be reversed at this time. Reversal of the motors at either of positions 4 or 5 will also cause the insertion of two sections of resistance in the motor-circuit, and reversal at either of positions 6 or 7 will cause the insertion of the entire resistance in circuit. If desired, however, the contact c might be extended on the periphery of the drum through positions 6 and 7, in which case the same amount of resistance would be utilized upon reversal as in positions 2, 3, 4, and 5. If the motors are reversed when the drum C is in either one of its first six positions, it will be seen that a movement of said drum to the succeeding position will again close the auxiliary switches and remove the resistance from circuit, thereby allowing the motors to be run at full speed in the reverse direction. If the reversal occurs when the drum is at position 7, in order to remove the resistance from circuit it is necessary to move the drum backward one step. If in any case the supply-circuit for the motors becomes broken, as by the trolley leaving the conductor, the motorman can still place his motors under control by throwing his reverse-switch and moving the regulating-switch to the seventh position. The motors will then be connected in multiple on a closed local circuit, as shown in Fig. 4, and the stronger motor, acting as a generator, will dominate the other one, thus exerting a very powerful braking effect on the car.

In order to apply our invention to a controller, it will be seen that all that is required is to provide an auxiliary switch of some kind which will operate upon the reversal of the motors to open the normal short circuit around the resistance or some portion thereof and to provide a second auxiliary switch which will operate, if reversal occurs at a time when there is normally but little external resistance in the motor-circuit, to include additional resistance. It is obvious that many forms of switches may be devised to secure these results. We do not therefore wish to limit ourselves to the particular construction, combination, and arrangement which we have herein shown for the purpose of illustrating a complete embodiment of our invention.

Having thus described our invention, what we claim as new, and desire to secure by Letters Patent, is—

1. In a controller for electric motors, the combination of a regulating-switch, a reverse-switch having an open-circuit position between its ahead and back positions, external resistance for connection in the motor-circuit, and means for automatically inserting said resistance in the said circuit by the movement of the reverse-switch across its open-circuit position.

2. In a controller for electric motors, the combination of a regulating-switch, a reverse-switch and a rheostat, of means whereby the opening of the motor-circuit at the reverse-switch effects the connection in said circuit of the rheostat.

3. In a controller for electric motors, the combination of a regulating-switch, a reverse-switch having an open-circuit position between its ahead and back positions, a rheostat, means for automatically connecting said rheostat in the motor-circuit upon the movement of the reverse-switch across its open-circuit position, and means whereby subsequent movement of the regulating-switch will remove said rheostat from circuit.

4. In a controller for electric motors, the combination with a regulating-switch, a reverse-switch, and a rheostat, of an auxiliary switch, arranged to coöperate with certain contacts of the regulating-switch to short-circuit the said rheostat in the higher-speed positions of the regulating-switch, and means whereby the opening of the motor-circuit at the reverse-switch will effect the opening of said auxiliary switch.

5. In a controller for electric motors, the combination of a regulating-switch, a reverse-switch, and external resistance for connection in the motor-circuit, of a short circuit for said resistance in the higher-speed positions of the regulating-switch, and means whereby the opening of the circuit at the reverse-switch will effect the opening of said short circuit.

6. In a controller for electric motors, the combination of a reverse-switch, a regulating-switch, and external resistance for connection in the motor-circuit, of an auxiliary switch operated by the movement of the regulating-switch beyond a certain position to short-circuit the said resistance, and means whereby the opening of the circuit at the reverse-switch will open said auxiliary switch and thereby the said short circuit.

7. In a controller for electric motors, the combination of a reverse-switch, a regulating-switch, and external resistance for connection in the motor-circuit, of an auxiliary switch operated by the movement of the regulating-switch beyond a certain position to short-circuit the said resistance, and means whereby the opening of the circuit at the reverse-switch will open said auxiliary switch and thereby the said short circuit, together with means whereby subsequent movement of the regulating-switch will again close the auxiliary switch and restore the short circuit.

8. In a controller for electric motors, the combination of a regulating-switch, a reverse-switch, a rheostat, an auxiliary switch arranged to coöperate with the regulating-switch to short-circuit the rheostat in the higher-speed positions of the regulating-switch, means for holding said auxiliary switch closed, and means for opening said switch when the motor-circuit is broken.

9. In a controller for electric motors, the combination of a regulating-switch, a reverse-switch, and a rheostat, of two auxiliary switches which coöperate with the regulating-switch to short-circuit said rheostat or sections thereof in certain positions of the regulating-switch, and means whereby the opening of the motor-circuit at the reverse-switch will effect the opening of the said auxiliary switches.

10. In a controller for electric motors, the combination of a regulating-switch, a reverse-switch having an open-circuit position between its ahead and back positions, external resistance for insertion in the motor-circuit, an auxiliary switch coöperating with contacts of the regulating-switch to short-circuit the said resistance in the higher-speed positions of said regulating-switch, a magnet for holding said switch in closed position and having its coil included in the motor-circuit, and a cam actuated by the regulating-switch for moving said auxiliary switch into the field of action of said magnet.

11. In a controller for electric motors, the combination of a regulating-switch, a reverse-switch, and external resistance for connection in the motor-circuit, of an auxiliary switch operated by the movement of the regulating-switch beyond a certain position to short-circuit said resistance, a second auxiliary switch, also operated by the regulating-switch to form a short circuit for a portion of the resistance, and means for opening both the said auxiliary switches when the circuit is opened at the reverse-switch, and also means for again closing said switches upon subsequent movement of the regulating-switch.

12. In a controller for electric motors, the combination with a regulating-switch, a reverse-switch, and external resistance for connection in the motor-circuit, of two auxiliary switches which coöperate with the regulating-switch to short-circuit said resistance or portions thereof, a lever carrying the movable parts of said auxiliary switches, a magnet, whose coil is included in the motor-circuit, a cam, carried by the regulating-switch for moving one arm of said lever into the field of action of the magnet, and a spring for effecting the return movement of said lever when the magnet is deënergized.

13. In a controller for electric motors, the combination of a regulating-switch, a reverse-switch, and artificial resistance for insertion in the motor-circuit in the starting positions of said regulating-switch, of an auxiliary switch arranged to short-circuit said resistance, a magnet for holding said switch in closed position and having its coil included in the motor-circuit, a cam device carried by the regulating-switch for moving the movable member of said switch into the field of action of said magnet, and a spring for effecting the return movement of said member when the motor-circuit is opened.

In testimony whereof we have affixed our signatures in presence of two witnesses.

F. W. GARRETT.
EMMETT W. STULL.

Witnesses:
CORA G. COX,
H. W. SMITH.